US005239165A

United States Patent [19]

Novak

[11] Patent Number: 5,239,165

[45] Date of Patent: Aug. 24, 1993

[54] BAR CODE LOTTERY TICKET HANDLING SYSTEM

[75] Inventor: Jeffrey M. Novak, Eugene, Oreg.

[73] Assignee: Spectra-Physics Scanning Systems, Inc., Eugene, Oreg.

[21] Appl. No.: 954,462

[22] Filed: Sep. 30, 1992

Related U.S. Application Data

[63] Continuation of Ser. No. 879,142, Apr. 28, 1992, abandoned, which is a continuation of Ser. No. 684,676, Apr. 11, 1991, abandoned.

[51] Int. Cl.[5] .............................................. G06F 15/20

[52] U.S. Cl. .................................... 235/375; 235/380; 235/383; 364/411; 364/412

[58] Field of Search ........................ 235/375, 380, 383; 364/411, 412

[56] References Cited

U.S. PATENT DOCUMENTS 4,854,590 8/1989 Jollier et al. .................... 235/380 X
4,937,853 6/1990 Bruce et al. .......................... 364/412
4,993,714 2/1991 Goligihtly ....................... 235/380 X

*Primary Examiner*—Harold Pitts
*Attorney, Agent, or Firm*—Thomas M. Freiburger

[57] ABSTRACT

A point of sale system involving a series of check stands with POS cash registers and bar code scanners includes a lottery ticket issuing and redemption system. A number pick stand in the store, apart from the checkout stands, enables the customer to choose numbers. Pick slips can be generated by the customer at this stand, and bear a bar coded transaction number which can be communicated to a lottery device at each check stand. The pick slip is readable at the check stand bar code reader along with a series of store-inventory items. The customer is automatically charged for the lottery ticket, and the ticket is printed at the check stand. At the time the ticket is issued, the lottery transaction is recorded via modem to the central lottery computer of the state or other controlling agency. In another embodiment the number pick stand may encode the actual picked numbers on the pick slip, in an extended field bar code. The system of the invention enables lottery ticket transactions to be smoothly and efficiently handled at each check stand of a supermarket without in substantially the same manner grocery items are handled and without burdensome and expensive duplication of lottery equipment.

21 Claims, 7 Drawing Sheets

BAR CODE LOTTERY TICKET HANDLING SYSTEM

This is a continuation of co-pending application Ser. No. 879,142, filed on Apr. 28, 1992, now abandoned, which is a continuation of co-pending application Ser. No. 684,676, filed on Apr. 11, 1991, now abandoned.

BACKGROUND OF THE INVENTION

The invention relates to bar code scanners and retail point of sale networks, and in particular the invention is concerned with integrating and interfacing a lottery ticket issuing and redemption system with bar code readers used for scanning products in a point of sale (POS) network. The invention permits lottery tickets to be issued and redeemed from any of a number of different check stands in a store, using only one telephone line link to a remote central lottery processor.

A large number of states in the United States, as well as several foreign countries, have government-run state lotteries. A form of legalized gambling, these lotteries are almost all very similar in the format of a main lottery game often known as "lotto". This game is based on a combination of six numbers picked by the player/customer or randomly (a "quick pick"), and a subsequent state lottery drawing of six different numbers as the winning numbers for the game period. Games may occur weekly or more frequently. The invention is concerned with these and other similar games involving selected numbers, whether the games are run by government agencies or other entities.

The numbers which may be selected for play, and which may be drawn as winning numbers, are from a range the width of which is selected by the state to give the desired odds for the game. For example, the State of California, which originally had a range of numbers 1 through 49, extended its lottery number range to 1 through 53.

In the typical state lottery system, a large central lottery computer is linked by telephone line and modem with all retail lottery ticket-issuing terminals in the system. The state lottery system usually purchases the terminals and other hardware and places a telephone line into each participating store. The retailer is usually charged a fee for installation and a periodic service charge. Serialized printing paper stock is typically provided by the state lottery system to each participating store.

In the typical system all lottery numbers, whether customer-selected or quick picks, go "on-line" to the central lottery computer at the time of purchase. A serial number is assigned and printed on each lottery ticket, which is used to uniquely identify all plays on the particular lottery ticket,. One method is to use the serial number as a pointer to an electronic record of each transaction kept on the central lottery computer, each record including the serial number, picked numbers, retailer, etc. This record is maintained for the duration of the game being played, with all "winners" maintained in the central computer for redemption at a later date. In California, for example, the "active" database for the state lottery can contain 28 million records on a given day.

In current lottery systems, a ticket printer forms a part of a self-standing lottery terminal which also includes a keyboard, a display, an optical reader and modem. The terminal's ticket printer typically prints a type of crude bar code that is used by the optical reader of the dedicated lottery terminal, to represent a serial number or look-up number as discussed above, for the numbers selected for a play. These codes are not readable in a UPC type bar code scanner system, of the kind widely used in supermarkets.

The great bulk of lottery ticket sales (particularly for the six-number "lotto" game) have in the past been generated by convenience stores, carry-outs and liquor stores. Often small grocery stores having only a sinqle checkout counter will have a lottery terminal; however, few supermarkets have these number game terminals, because of the problem of outfitting every check stand with a separate terminal. The supermarkets may sell "instant game" type lottery game pieces or "scratch-off" lottery tickets, sold by the roll to each retailer, since these can easily be stored for sale at each of a number of check stands and do not require any special terminal equipment for sales or redemption.

In general, there are several reasons why supermarkets have not widely participated in state lotteries of the type described. Even though the state lottery system generally pays for the hardware, the multiple-check stand stores would be required to have a relatively large terminal machine at each check stand. The checkout personnel would be required to be trained in and perform an additional function separate from the normal sale of store inventory items—there has been available no integration of the two types of transactions. The non-integrated nature of this situation tends to slow the checkout procedure, potentially annoying other customers. Also, a checkout person has the responsibility of being a game validator.

It is a principal purpose of the present invention to establish a lottery ticket issuing and redemption system which can easily be integrated into and/or interfaced with a POS bar code scanner system of the type widely used in supermarkets. Thus, a goal of the invention is to provide a system which is attractive to supermarkets as to convenience, efficiency of issuance and redemption of tickets, cost, and minimal modification of existing POS scanner equipment. A companion purpose is to provide a system which is superior from the point of view of the state lottery system, particularly in reducing the expense of installing terminals in a supermarket which may have six to ten or more individual check stands. A related purpose is to integrate a lottery ticket issuing and redemption system with a conventional supermarket bar code scanner system in a way which will enable the same store scanner to be used for lottery tickets, integrated with existing POS in a transparent method such that minimal or no modification is required to existing equipment.

A primary purpose in particular embodiments of the invention is to provide a bar code lottery ticket handling system which is compatible with supermarket bar code scanning as currently defined by the Uniform Code Council (UPC) and by the European Article Numbering Association (EAN).

U.S. Pat. Nos. 4,832,341 and 4,937,853 have some pertinence to this invention in that they relate to lottery systems. In U.S. Pat. No. 4,832,341 there is disclosed a high security instant lottery game using bar codes. However, this patent does not relate to "lotto" type games wherein a customer selects numbers (or quick picks) for matching to a future lottery drawing. Also, the patent does not address the interfacing problems addressed by the present invention, particularly for a supermarket having multiple check stands.

U.S. Pat. No. 4,937,853 relates to lottery games and telephone line interfacing with a central lottery computer or "lottery host computer", but the patent does not address the problem of interfacing with a supermarket POS network or integrating the duties of a check stand person in regard to store inventory purchases (goods normally sold by the store) and lottery ticket purchases or redemptions. The patent is concerned with eliminating the need for manual dialing when a participating store deals with the central lottery computer, and this is achieved using a hand-held scanner which reads a bar code on a type of lottery ticket.

SUMMARY OF THE INVENTION

In accordance with the present invention, a lottery ticket system is provided which is particularly adapted for supermarkets which have bar code scanning equipment for automatic reading and charging of customer inventory-item purchases.

The system of the invention accomplishes efficient issuance and redemption of lottery tickets in "lotto" and like number games in multi-lane supermarket locations. An important advantage is the ability to use existing product scanner equipment already in place at check stands of many supermarkets. The integrated system eliminates the requirement of clerk intervention to effect a lottery transaction but enables the clerk to continue the normal scanning procedure used with all purchased store inventory products. No additional time is required of the check stand purpose to service a customer's lottery transaction, over the normal time required for store item purchases.

Another important consideration is that the system of the invention requires minimal space at the check stand. The system allows a lottery customer to bring personally selected numbers to the check stand, or to request "quick picks", at maximum convenience to both the customer and the check stand person.

In principal embodiments of the invention, each participating store has a lottery pick slip generating stand which is separate from the check stands. One or many may be used, depending on the number of players and usage rate for the particular store. At the pick slip generating stand the lottery player can enter selected lottery numbers for playing the lottery game, on a keyboard and preferably with the assistance of a prompting and confirming screen. The pick slip stand generates a pick slip which bears the picked numbers in readable print for the customers and which bears a bar code identifying the pick slip transaction.

In one specific embodiment the actual picked numbers are transmitted through wiring to a lottery device or "black box" which is positioned at most or all of the check stands, (all check stands capable of lottery transactions). Thus, as soon as a pick slip is generated for a customer, the picked numbers are stored temporarily at each of the check stands or are available for call-up on a network from each check stand, along with the identifying code for the pick slip transaction. In alternative embodiments the pick slip may bear all of the actual picked numbers in expanded bar code formats, readable directly at the check stand.

At the check stand, the customer/lottery player presents the pick slip to the check stand clerk, and this can be along with a series of store inventory items for purchase.

In an embodiment of the system which is most preferred, the bar code encoded on the pick slip will bear only a serial number or transaction number which has been generated through the pick slip process. The lottery devices equipped at the check stands are networked together for common communication with the pick stand; thus, the lottery numbers picked by the customer will be available on call at any of the check stands, by the inputting of the serial number or transaction number. This input is accomplished by the reading of the lottery pick slip at the check stand's scanner, in the same way a box of cereal or a loaf of bread is read.

Following such reading, wherein the pick slip transaction number is entered into the lottery device at the check stand, the associated selected numbers of the particular customer are called up at the check stand lottery device. This begins a chain of events which will cause the issuance of a lottery ticket to the customer, and the charging of the customer for the lottery transaction in the same manner the customer is charged for the purchase of store inventory items, and preferably on a common register receipt.

Once the check stand scanner has determined that a valid bar code has been read, the lottery device, preferably positioned between the scanner and the point of sale terminal including the cash register, reviews the read data to determine whether the bar code represents a lottery transaction or a normal store inventory item. The lottery device also determines whether a quick pick has been selected along with customer-picked numbers (the selection of one or more quick picks can be indicated with the transaction as received from the pick slip stand, or it can be indicated verbally by the customer at the check stand, whereupon a button is pushed on the lottery device or "black box" to enter one or more quick picks). If quick picks have been selected, they are now generated, preferably from a random number generator contained within the lottery device at the check stand.

Once the above events have occurred, the central lottery computer (normally in a distant city) must be contacted over the telephone link. The lottery device places the lottery transaction information into a buffer for transmission to the central lottery computer, and normal grocery scanning proceeds while the transaction is being processed. When the buffer has completed transmission of previous lottery transactions, the present lottery transaction is sent to the central lottery computer via modem and telephone line. Meanwhile, a printer of the lottery device may begin printing headers of the lottery ticket.

Next, acknowledgement is received from the central lottery computer, after which the body of the lottery ticket is printed, bearing the selected numbers in customer-readable form. The lottery device receives and acknowledges a serial number (different from the local transaction number) from the central lottery computer. The remainder of the lottery ticket is then printed, including the central system-issued serial number, in bar code format. In preferred embodiments this is the only information which need be in bar code format on the issued lottery ticket itself.

Using the store system, the lottery device or "black box" then sends a price look-up record to the POS system denoting debit/credit. The POS terminal or cash register will then debit/credit the transaction and print, for example, "Lotto $1" on the customer's receipt, along with listing of other purchased items.

Along with the printing of the receipt, a transaction record is written into the POS system, a sales counter is incremented, if applicable, and a final acknowledgement or final data is sent to the central lottery computer.

The store lottery buffer is then cleared for the present transaction, and further transactions may be processed. The lottery ticket is presented to the customer along with the purchased items.

In one embodiment of the present invention, a point of sale bar code reader system which integrates the checkout functions relating to purchased items and the purchase of lottery tickets, and which is interfaced with a store system having a plurality of point of sale cash registers at check stands, includes a lottery pick slip generating device in the store. The pick slip generating device or pick slip stand has means for enabling a lottery player to enter selected lottery numbers to play a lottery game, and for printing on a lottery pick slip a bar code identifying the pick slip transaction. A lottery data receiving means or "black box" is connected to the bar code scanner at least at some of the check stands, being connected between the bar code scanner and the point of sale network at such check stands. The lottery data receiving means includes means for recognizing the bar code imprinted on the pick slip when the pick slip is read by the scanner, and for differentiating pick slips from store inventory purchase items. A ticket printing means is connected to the lottery data receiving means or "black box", for printing a lottery ticket based on the numbers selected by the lottery player, and showing the selected numbers on the printed lottery ticket. The printed ticket may include one or more "quick pick" series of numbers.

A modem means is connected to the lottery data receiving means for telephone line communication with a remote central lottery computer or processor, and for sending data relating to each lottery transaction and the numbers selected by the player for the lottery game, and also for receiving back from the central lottery computer an appropriate confirmation. Further, the lottery data receiving means includes a lottery transaction transmitting means for sending data relating to particular lottery transactions at a check stand to the modem means for communication to the central lottery computer. The lottery data receiving means also includes a means for communicating with the store point of sale network and for presenting lottery transaction data to the POS network that can be understood by the store controller in the same manner as purchased store inventory item data is understood and received.

The store point of sale network includes means for sending to the point of sale cash register data charging the lottery player/customer for the lottery ticket and for causing the lottery ticket issuance transaction and sale to be recorded by the point of sale cash register and reflected on a receipt along with purchased store inventory items.

It is therefore among the objects of the present invention to provide a lottery ticket issuing and redemption system which efficiently uses bar codes, with those bar codes being readable by a store's check stand scanner in the manner normal grocery items are read. A related object is to enable efficient interfacing of lottery ticket sales for "lotto" type games with normal check stand functions in a supermarket having a plurality of check stands, without requiring burdensome and costly equipment at each individual check stand. These and other objects, advantages and features of the invention will be apparent from the following description of preferred embodiments, considered along with the accompanying drawings.

DESCRIPTION OF PREFERRED EMBODIMENTS

Figure 1:
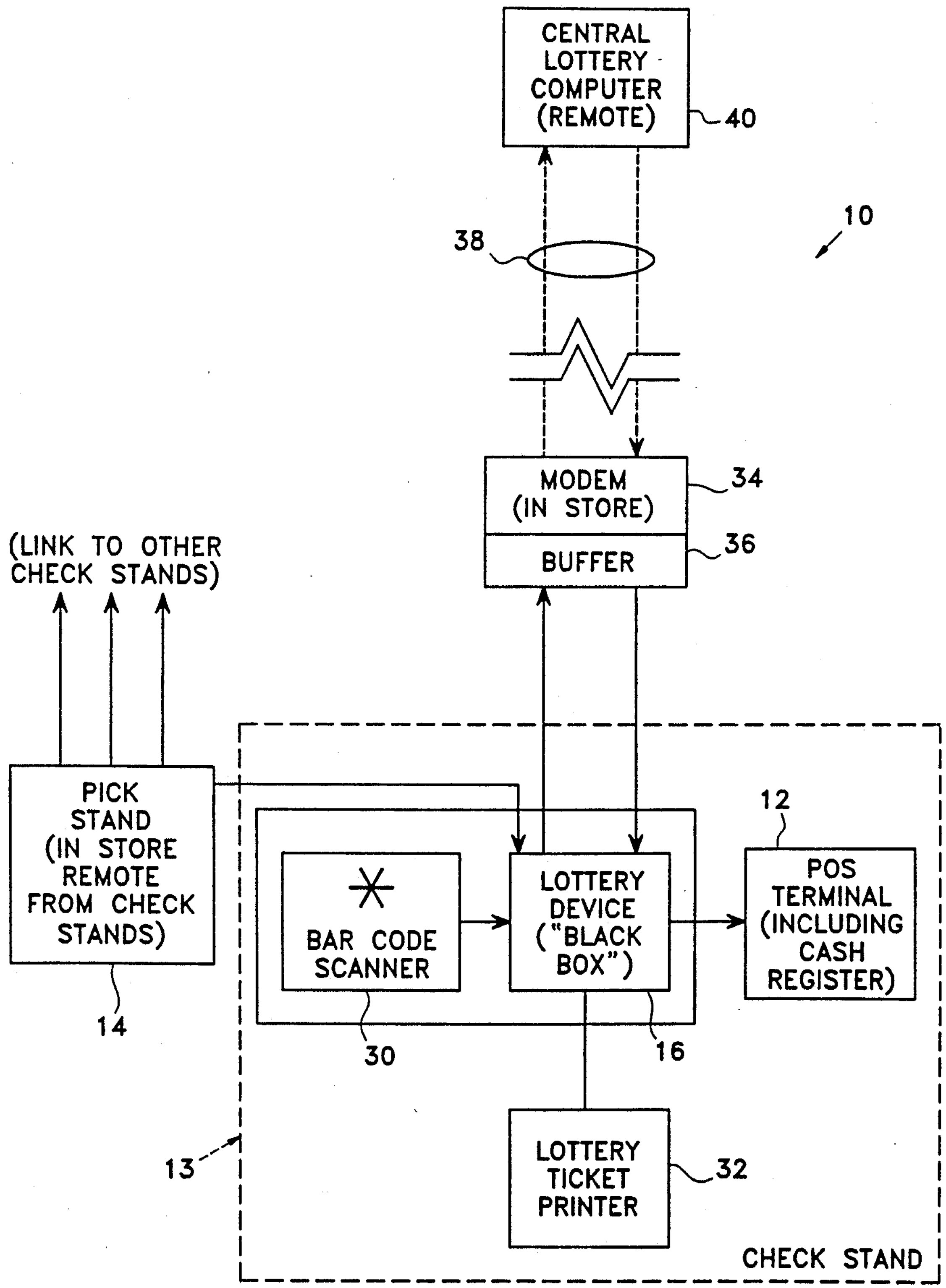
FIG. 1 is a schematic block diagram type view indicating the interfacing of a bar code lottery ticket system with a store system which may include a plurality of point of sale (POS) terminals, and also showing interfacing with a remote central lottery computer.

In the drawings, FIG. 1 shows a system 10 following the principles of the present invention.

FIG. 1 represents one preferred embodiment of the invention. In this embodiment, shown simplified with only one POS terminal 12 of the store indicated (which is at a check stand 13), a pick stand or pick slip generating stand 14 is shown at a remote position in the store, separate from the POS terminal 12, and from all other check stands. The remotely located pick stand 14 is shown connected to a lottery device or "black box" 16 which is located at the check stand. The connection typically will be by wiring, but could also be by a short range radio frequency link if desired.

Figure 4:
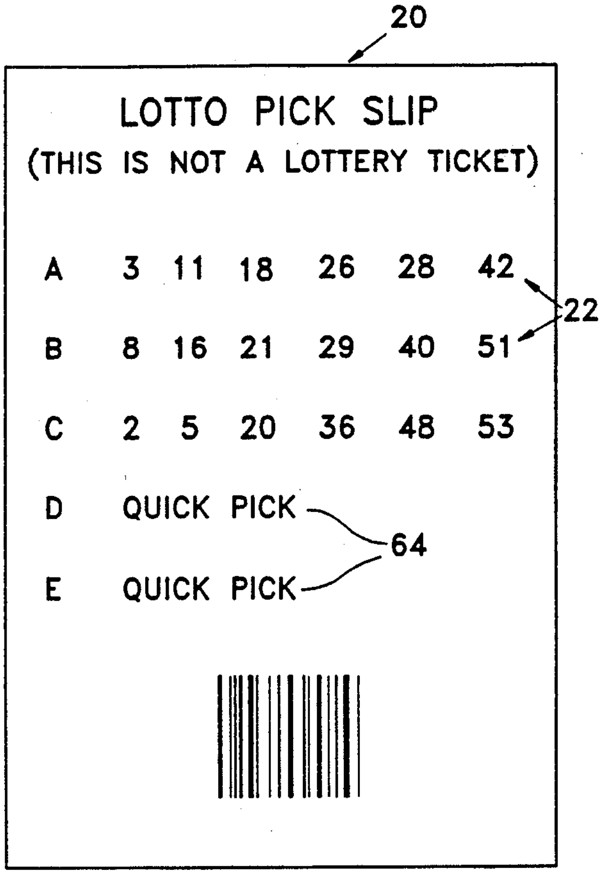
FIG. 4 shows an example of a pick slip which can be generated by the customer/player, when one or more random "quick picks" are desired along with one or more series of customer selected numbers.

The pick stand 14, as will be seen further below, enables a customer/lottery player to enter selected play numbers and to generate a pick slip such as the pick slip 20 shown in FIG. 4. The pick slip 20 shows the customer his selected group of numbers 22 by having them printed directly on the pick slip when it is generated. There may be several groups of numbers, one group for each "play" which the customer desires up to, for example, five groups of numbers. These may be for the typical numbers game usually known as "lotto". In addition, the pick slip includes a bar code 24 which is printed at the pick slip stand 14 as a transaction number or "look-up" number to which the player's selected numbers are electronically coupled. Although the equipment at the pick slip stand 14 preferably prints this bar code, it could be preprinted on each pick slip blank, with the equipment associating the bar code identification number with the particular transaction. This association could be made by the use of serially increasing bar coded numbers on the pick slip blanks, keyed with the equipment, or by a bar code reader inside the equipment.

In any event, the bar code 24 on the pick slip represents a transaction number or code which is tied to the customer's selected play numbers in the pick stand equipment. This information is sent to the lottery device 16 over the depicted connection, or it is available in a buffer or short term storage in the pick stand 14 for call up by the lottery device 16 at the check stand (or at any of a number of check stands).

The "black box" or lottery device 16 at the check stand is located between a bar code scanner 30 and a POS (point of sale) terminal 12. This is an important feature of preferred embodiments of the invention. The lottery device 16 has programming to recognize a lottery pick slip as such when one has been scanned on the bar code reader 30. Since all bar codes scanned on the check stand scanner 30 must be passed through the lottery device 16 en route to the POS terminal 12, the lottery device reviews every signal from the scanner and is constantly searching for a signal representative of a lottery ticket or lottery pick slip. The bar code 24 on the pick slip has a component denoting it first as a lottery item in general and second as a lottery pick slip as opposed to a lottery play ticket. The lottery device 16 will intercept signals relating to lottery items, so that they are not passed on to the POS terminal 12.

In one embodiment of the present invention, the lottery device or "black box" may be integral with the bar code scanner at each check stand. One level of integration can simply comprise the "black box" 16 being included in a common housing with the bar code scanner 30, which is indicated by a box 31 in FIG. 1. The physical integration within the housing may be important if new scanner equipment is being installed in a store desiring the lottery ticket handling system of the invention. The lottery ticket printer 32 can still be a separate unit, or it, too, can be physically incorporated in the same housing with the scanner and "black box". Even with such integration, the "black box" 16 is still located electronically between the scanner 30 and the POS terminal 12.

A more preferable level of "black box"/scanner integration is an electronic integration. The black box has several functions and hardware components in common with the scanner, including a microprocessor or other microcontroller, input and output (to the POS terminal), a power supply, certain software, and certain communication channels. The integrated scanner/"black box" 31 can share these components and functions. Still, the "black box" functions will be positioned between the bar code scanner and the POS terminal, in the same sense as discussed previously. That is, when the scanner makes a good read on a bar code, it normally sends the data to the POS terminal, bu if the "black box" functions of the integrated device 31 detect that the item read is a lottery item, the data transmission is interrupted so that the lottery procedure can be carried out.

The lottery device or "black box" 16, present at each check stand where lottery tickets can be purchased, acts as a lottery data receiving means and has several functions. In addition to screening every good bar code scan read at the scanner 30, the device 16 (1) intercepts bar codes reads which represent lottery transactions, as above; (2) communicates with a lottery ticket printer 32; (3) ignores bar codes representing purchased store inventory items and passes them to the POS terminal 12 at the check stand; (4) communicates with the pick stand equipment 14, as above; and (5) communicates at appropriate times with a modem 34 via a buffer 36, in order to communicate via telephone line 38 with the remote central lottery computer 40. The central lottery computer 40, as in typical state lotteries, is a central clearing instrument for all "lotto" type transactions (i.e. the numbers series games) within the system, and as explained above, has a constant telephone line hookup with each store which sells this type of lottery game tickets. The central lottery computer 40 enables and confirms all lottery sales transactions and lottery ticket redemptions up to specified amounts; and typically issues over the telephone lines a confirming serial number for the particular "lotto" ticket, this serial number being associated with the central lottery computer with the recorded series of numbers for the customer's plays.

Figure 2:
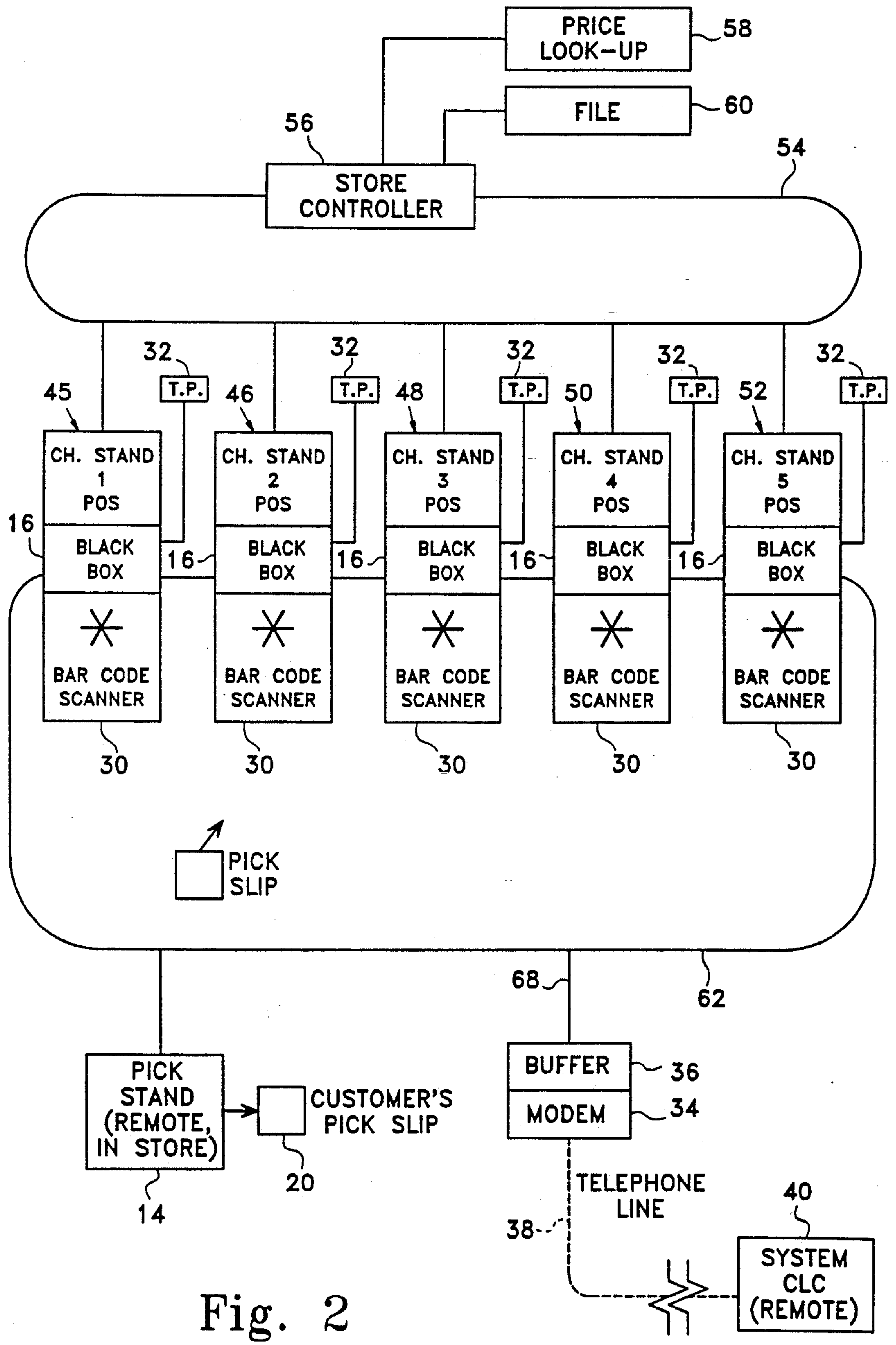
FIG. 2 is another schematic block type diagram showing the system of the invention as interfaced with a point of sale (POS) system in a typical supermarket having a number of check stands.

FIG. 2 indicates a store system and the interfacing of the lottery ticket issuing system of the invention into the store system. FIG. 2 shows many of the same components and connections that are shown in FIG. 1, but is more directed to the overall system of the invention as incorporated in a multiple-check stand store such as a supermarket.

FIG. 2 shows the typical multi-check stand system such as a supermarket, having bar code scanners at all check stands, or at most check stands. In FIG. 2 check stands 45, 46, 48, 50 and 52 are networked together as indicated by a connection line. In this on-line network is a store controller 56 which communicates with individual check stands for each customer transaction. As is typical in these store systems, each check stand has a POS terminal 12 which communicates with a bar code scanner 30 used to scan store inventory items brought to the check stand by the customer. The POS terminal includes a cash register with a processor. All POS terminals 12 are connected via the network 54 to the store controller 56. Each time a store item is scanned on one of the bar code scanners, and a good read is detected, the read information in the typical system goes to the POS terminal 12. Information regarding the scanned item is immediately sent into the network 54 and is recorded by the store controller 56. The controller effects price look-up as indicated at 58 and returns price and description information to the POS terminal. When a transaction is completed, all information on the transaction is typically then recorded in a store file 60 which may be located in the POS terminal, or the controller, or both (in some POS systems the store controller handles inventory accounting, but individual POS stations hold sales data for the particular station).

In the system of the invention, as noted earlier, a "black box" or lottery device 16 is connected between the bar code scanner 30 and the POS terminal 12 at each check stand, for the purposes described above. Information regarding all store inventory item purchases read at a bar code scanner 30 is passed through by the black box to the POS terminal 12. When a pick slip 20 is presented by a customer, which may or may not be along with a series of store inventory items, the pick slip is held face down by the check out clerk and moved across the bar code scanner in the normal manner used for other store purchases. Once a good read is detected, the black box 16 takes the pick slip information (i.e. the bar coded serial number 24), recognizes it, identifies a lottery transaction in general and does not pass this pick slip information on to the POS terminal. Further, the black box recognizes the bar code as relating to a pick slip and not a lottery ticket. In this preferred embodiment the black box takes the detected serial number into an internal buffer and, through a network indicated by a line 62, communicates with the pick stand 14 to seek a matching serial number for a pick slip transaction held in local memory at the pick stand.

For example, the first available digit of the bar code (in this case a UPC code) might be a 2 to indicate a noninventory item, or in-store printed or under store control. If the second digit is a zero, this might indicate a pick slip, while anything other than a zero as the second digit could indicate a lottery ticket, with that digit serving as part of the serial number. Similarly, any of a specific range of numbers as the second digit can indicate pick slip, while another range can indicate lottery ticket.

If a matching pick slip transaction, determined by its unique serial number, is found in the pick stand memory or buffer, the information associated with the particular pick slip is communicated via the network 62 to the black box at the check stand. This information includes, as shown in the example of FIG. 4, all games and related numbers series selected by the customer, and it can indicate that the customer has selected one or more "quick picks" as indicated at 64 in FIG. 4. As will be seen in greater detail below with reference to the flow chart of FIG. 6, the check stand black box then processes the lottery ticket transaction through the network 62, a line 68 leading to the buffer 36 and modem 34, and over the telephone line 38 to the central lottery computer 40.

The result is that the lottery ticket purchase transaction is processed and confirmed by the central lottery computer and the actual lottery ticket is printed by the lottery ticket printer 32 at the check stand (see FIG. 1). A debit record is sent to the controller 56 for price look-up (PLU) and return of price/description, and the transaction is recorded (either at the controller or at the respective POS).

In large supermarkets or other large multiple check stand stores, more than one modem 34 and telephone connection 38 to the central lottery computer 40 may be required. The use of two or more such modems and telephone links is easily implemented with conventional telephone call and line switching equipment. Thus, the description and the claims herein are not intended to imply that only a single modem and telephone line should be included.

Figure 3:
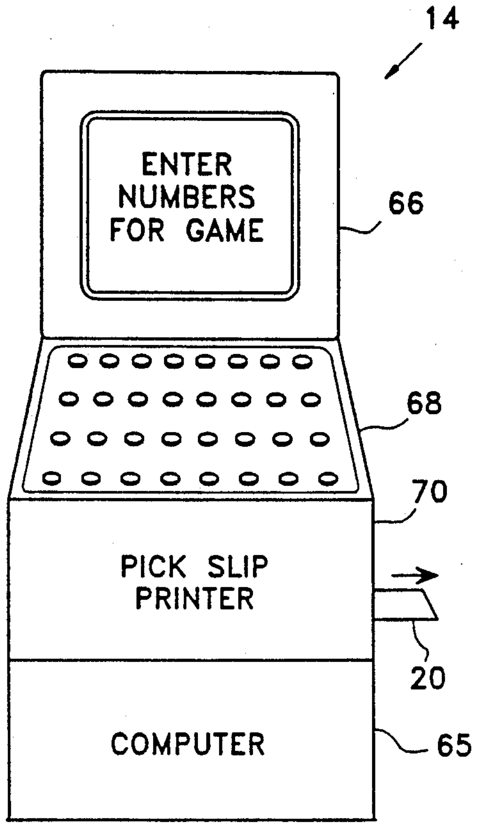
FIG. 3 is a schematic diagram showing in greater detail a pick stand or pick station for enabling lottery players to enter their picked numbers and to generate a pick slip.

FIG. 3 is a schematic indication of components of the pick stand 14. The pick stand includes a communication/control device 65 such as a computer or microprocessor connected to a display screen 66, a keyboard 68 and a pick slip printer 70. The display screen 66 can prompt the customer/lotto player to use the keyboard 68 in order to enter the numbers desired for play in the lottery game. A display including, for example, the series of numbers 22 and the indications of "quick pick" 64 shown in FIG. 4 can appear on the screen as they are entered by the customer. Once the customer indicates that the desired plays have been fully entered, an appropriate key on the keyboard 68 can be pushed to result in the issuance of the pick slip 20 out of the printer 70.

In a further embodiment of the invention, the pick stand can print a pick slip which actually will become the lottery ticket itself upon a later validation at the check stand. Thus, the pick slip can appear generally as represented in FIG. 4 until it is brought to the check stand. At that point, communication with the central lottery computer can be initiated via modem, and the check stand printer can physically indicate a validation on the ticket. This will follow recording of the picked numbers at the central lottery computer in association with the transaction, then a confirmation from the central lottery computer that causes the printer to make the validation. For example, the in-store serial number 24 (shown in FIG. 4) might be cancelled, and a new bar-coded lottery ticket serial number printed on the ticket, with a further header printed indicating that the piece of paper is now a lottery play ticket. In this way, the lottery transaction is streamlined, with only one lottery item printed, first as a pick slip with later conversion to the actual lottery ticket. The customer is charged for the lottery ticket at the check stand, at the time of validation, in the same procedure briefly discussed above and as outlined in FIG. 6, discussed below.

Figure 3A:
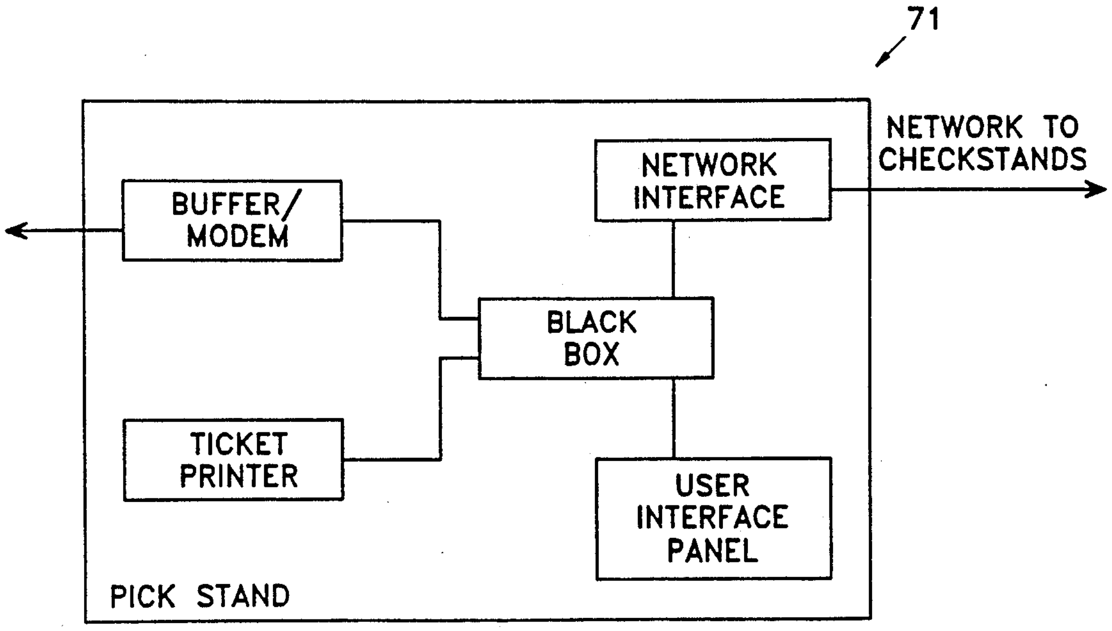
FIG. 3A is a schematic diagram showing a modified pick stand in another embodiment of the invention.

FIG. 3A shows a modified pick stand 71 representing a different embodiment of a lottery ticket handling system according to the invention. In the schematic pick stand 71 shown in FIG. 3A the concept of a single printed ticket is taken further, with a "black box" integrated into the pick stand as indicated. Also, the buffer and modem are indicated as being at the pick stand, making telephone line connection with the central lottery computer (CLC). A network interface connects the pick stand 71 to the check stands as in FIG. 2. Thus, as each item, grocery item or lottery item, is scanned at each check stand, data is sent to the pick stand and to the "black box" to make the determination as to whether the item is a lottery item or a grocery item. The network is connected between the bar code scanner and the POS system at each check stand so as to allow this brief interrupt and determination to be made, in the same manner as described relative to the inclusion of a "black box" 16 at each check stand.

Thus, at the modified pick stand 71 a customer can operate the user interface panel so as to cause a ticket to be printed at the pick stand. This can be given a bar coded serial number and can be recorded via the buffer/modem at the central lottery computer, in a manner also described below relative to the embodiment of FIG. 5. This single serial number can be carried on the pick slip/ticket, to be read at the check stand. At the check stand the customer is charged for the lottery games played, and some form of validation is physically put on the lottery ticket so as to indicate the ticket has been paid for and is valid. This validation can simply comprise a sticker or ink stamp applied to the pick slip/ticket, so that no lottery printing device need be provided at the check stand.

In such a system as described, the pick slip/lottery ticket actually constitutes a lottery play ticket at the conclusion of the pick stand transaction, insofar as the central lottery computer is concerned. Only the payment/validation function is handled at the check stand. However, in a variation of the embodiment described, the central lottery computer can issue a serial number only provisionally through the check stand transaction. The lottery play transaction can be voided if not validated at a check stand within a certain period of time, and never validated until the check stand transaction occurs. At the check stand, the bar coded serial number can be read at the scanner, causing a "black box" interrupt and thus causing the lottery ticket data to be sent by the buffer/modem to the central lottery computer, which will then validate the transaction and the lottery ticket.

There are several ways in which a validation can be made. In one alternative, once the bar coded serial number has been read at the scanner, the black box can send a signal to the check stand indicating validation, in the form of a "beep" of a sound device or in the form of a light signal. This will indicate that the lottery ticket is now valid, and the presence of the signal will enable the POS system to bill the customer for the lottery transaction. Instead of providing a dedicated beeper or signal, the system can take advantage of the POS beeper or signal light, perhaps with the visual or audible signal being somewhat different from that confirming proper grocery scans.

As another alternative, in POS systems that include a slip printer (for example for tender franking of customer checks), this same slip printer can be used to validate a lottery ticket by printing a notation on the ticket. This simply requires firmware to enable the POS terminal to recognize a signal different from those normally seen, and can easily be carried out at minimal cost. One way of using the POS terminal slip printer is to cause the slip printer to print another serial number on the lottery ticket, i.e. a validation serial number which might comprise a secure sequence of characters.

Figure 5:
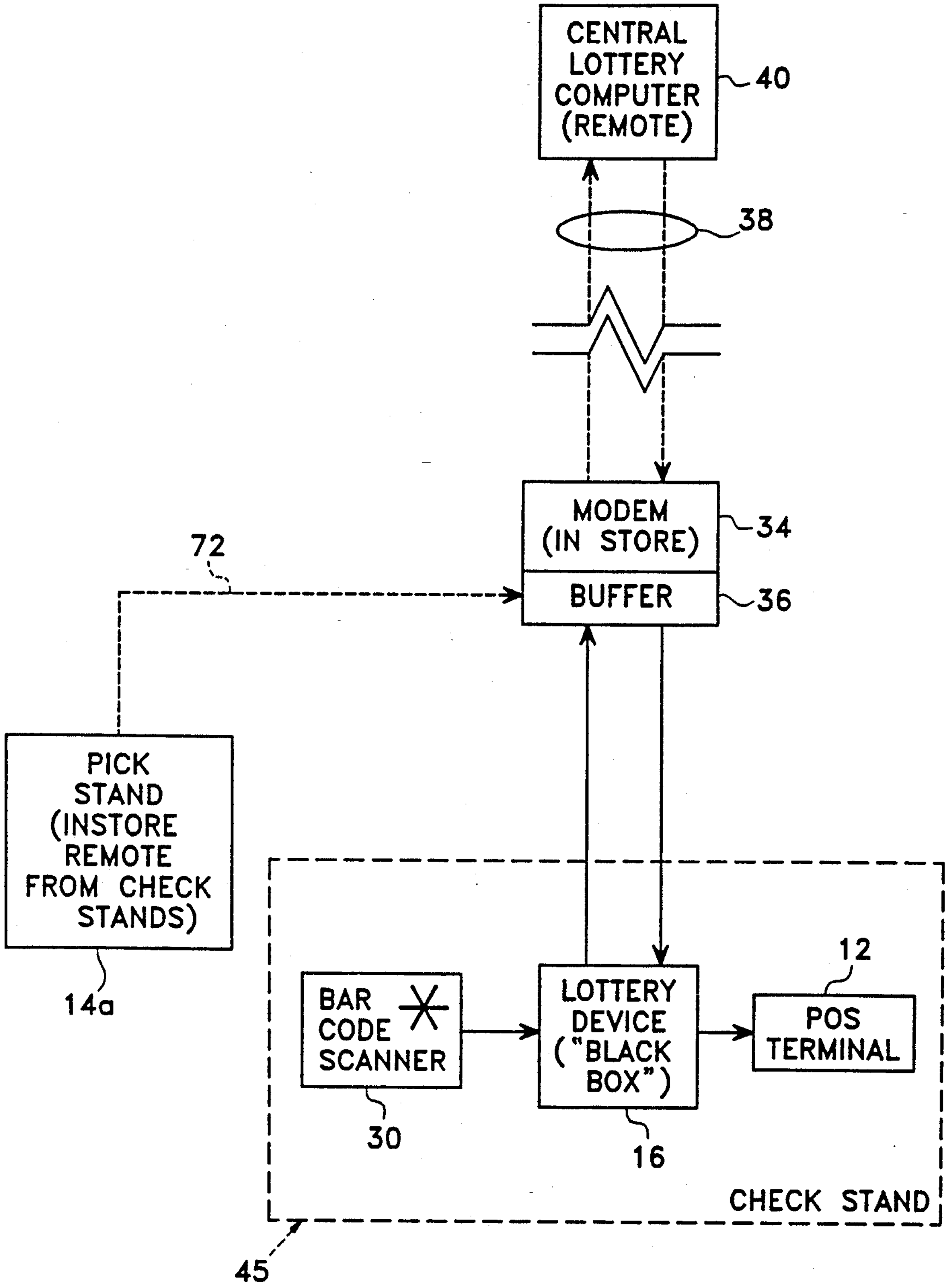
FIG. 5 is a view similar to FIG. 1 but showing a somewhat modified system.

FIG. 5 is similar to FIG. 1 but shows a modified embodiment of the invention. In FIG. 5 the pick stand 14*a* in one embodiment is shown as connected to the modem 34 (via the buffer 36), by a dashed line 72. Thus, in this embodiment the pick stand communicates a customer's selected numbers, as printed on an issued pick slip, to the central lottery computer for temporary storage. Instead of being available at the pick stand for call up by the "black box" 16 as in the embodiment shown in FIGS. 1 and 2, the "black box" in this embodiment can obtain the play numbers from the central lottery computer 40, over the modem 34, when and if the customer presents the pick slip at a check stand bar code scanner 30. It is also possible in this embodiment to generate a customer's pick slip in one store and generate the lottery ticket at a second store by scanning the pick slip.

As a further alternative embodiment, there can be no connection from the check stand to any of the other communication or processing equipment in the store. In that form of the system, the pick slip must contain bar codes representing all of the selected numbers, so that they can be directly read by the bar code scanner 30 at the check stand. Such an arrangement involves fewer communication links in the store, but requires that an extended-field bar code be used, as shown on the pick slips depicted in FIGS. 8-11.

Figure 6:
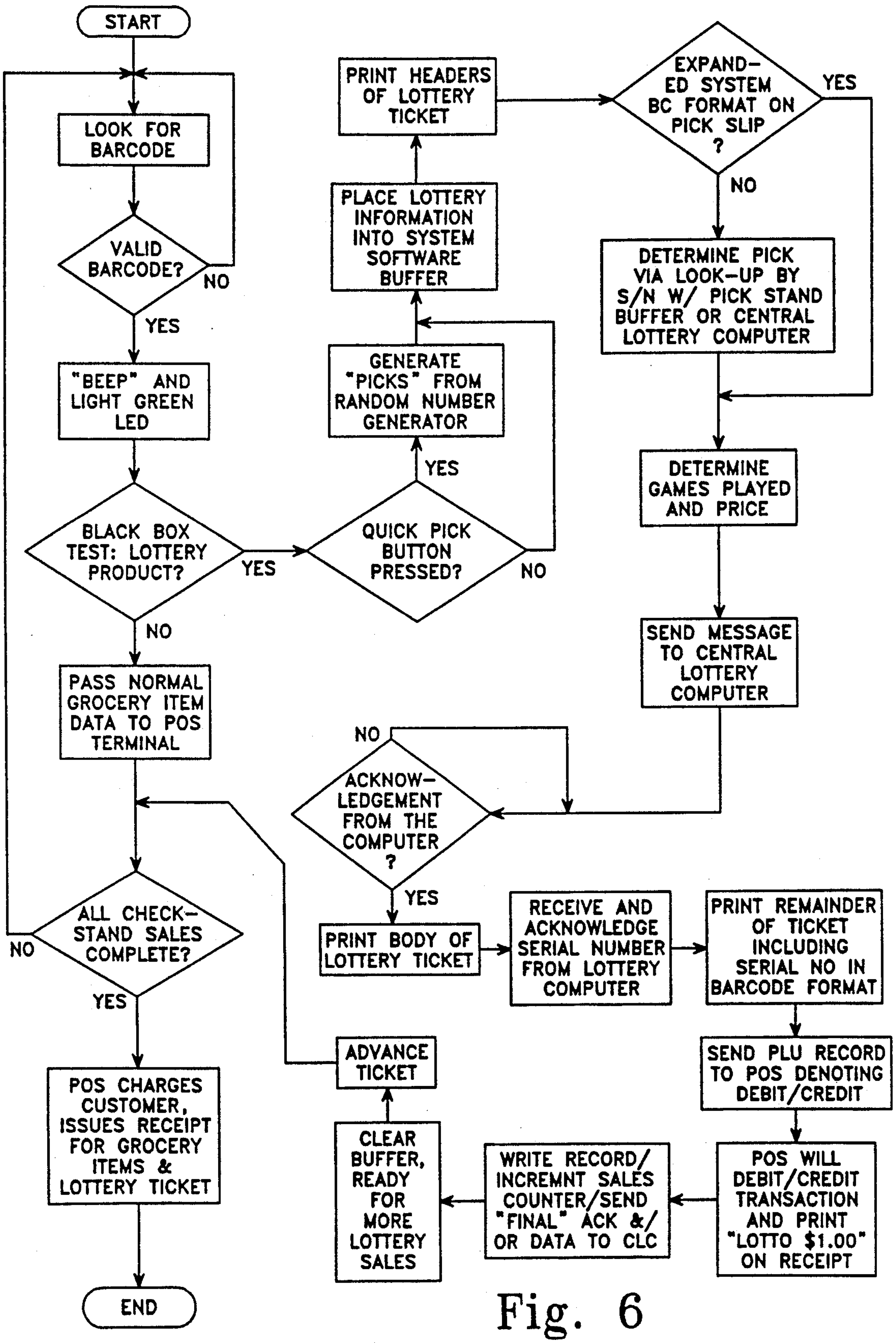
FIG. 6 is a flow chart showing steps in the use of the system of the invention.

FIG. 6 outlines the procedural steps exercised by the "black box" or lottery device 16 in encountering a pick slip presented by a customer along with store inventory items, as briefly described above. FIG. 6 is a top level flow chart, omitting many details of the machine-executed procedure.

The scanner 30 is repeatedly reading bar codes, and the "black box" 16 has the intelligence to determine via the code whether an on-line lottery ticket has been presented, or simply a norma grocery item. As indicated in the flow chart, the black box tests all data looking for a lottery product. A decision box indicates that a quick pick button may have been pressed, and this is an alternative to the customer-designated quick picks 64 on the pick slip of FIG. 4—a button can be included on the black box to permit the generation of a quick pick lottery ticket, if this is the only type of pick the customer desired. (In that case, no pick slip is needed and there is no reason for the customer to visit the pick stand 14.)

If such a quick pick button is pressed, the diagram indicates that a random number generator in the "black box" generates these quick picks.

Down the left side of the chart, it is shown that the bar code of a normal grocery item, properly read, will cause the normal green light and "beep" to occur. The grocery item data will be passed to the POS system.

If a lottery product is detected, the chart shows that the lottery information is placed into a lottery system software buffer, i.e., the buffer 36 shown in FIGS. 1 and 2 prior to being sent by the modem, and processing of the lottery item begins. This discussion will assume that the bar code has indicated a pick slip, as opposed to an actual lottery play ticket which is being presented for redemption.

While the lottery transaction is being processed, the system continues to allow grocery items to be scanned, with the entire lottery transaction being completed in parallel with the grocery scanning process. The flow chart indicates that the headers of the lottery ticket are begun to be printed (by the printer 32, FIG. 1) while this processing is underway.

Next, a decision box shows distinction between an expanded bar code format on the pick slip (with play numbers bar coded as in FIGS. 8-11, below) or the preferred embodiment wherein a bar code-read serial number initiates a look-up of the play numbers, either from a pick stand buffer or from the central lottery computer. This would normally not be a decision made in the system, since the system is set up in one way or the other.

In any event, if the pick slip provides a look-up function, i.e. only carrying a bar coded serial number, then the picked numbers are determined through the black box/pick stand network or from the central lottery computer. If expanded bar code formats are used, bearing all picks on the pick slip, then the data stream from the actual pick slip is used to define the play numbers.

If the state lottery includes different types of games including random numbers, this is determined by the bar code serial number on the pick slip and/or by the information stored in the black box network or at the pick stand, as indicated in the flow chart. In any event, in the embodiment shown in FIGS. 1 and 2 the black box at the particular check stand used by the customer, having the serial number or look-up number of the pick slip transaction, calls up the customer's play numbers through the black box/pick stand network (see FIG. 2). At this point the black box has all needed information for processing the lottery transaction, and neither the pick slip nor the pick stand stored information is needed further.

As indicated in the next block, a message is then sent to the central lottery computer via the buffer 36, modem 34 and telephone line 38, and the black box waits for acknowledgement. Once acknowledgement is received from the central lottery computer, the black box can cause the printer to print the body of the lottery ticket, with the customer's selected numbers. A lottery ticket serial number is received from the central lottery computer, and this is acknowledged by the black box, through another message sent to the central lottery computer. The remainder of the ticket is printed, with the lottery ticket serial number (and not the pick slip serial number) in bar code format on the ticket.

As indicated in the chart, a price look-up record is sent through the POS system (network 54, FIG. 2), denoting a debit for a lottery ticket purchase (or a credit in the event a winning ticket is being redeemed). The store controller 56 goes through its normal price look-up function (58), storing a record in the store file 60 (or at the respective POS), and the POS terminal records the debit/credit transaction on the customer's cash register receipt.

As indicated, the system may include optional functions of writing a transaction record, incrementing a sales counter and sending final acknowledgement to the central lottery computer. Following this, the buffer is cleared and the system can receive more lottery transactions.

The lottery ticket is advanced to the customer. If all check stand sales are complete, the POS issues a receipt and the customer is charged. Otherwise, the system continues to read bar codes of items brought to the check stand.

FIGS. 7 through 11 show alternatives for bar coding of lottery pick slips.

A six-number lottery game (such as "lotto" type games) would require the representation of twelve digits if the six picked numbers were to be put in bar code, plus digits to indicate the game played (where multiple games are possible). This would require more digits than are allowed by the fixed-length UPC-A definition. In a preferred embodiment described above, these selected numbers were not themselves represented in bar code, but a serial number or look-up number was bar coded onto the pick slip, and another, central lottery computer-confirmed serial number was bar coded on the actual lottery play ticket.

FIGS. 7 through 11 show various alternative formats which can be used on the pick slips, including alternatives which involve encoding of the actual selected lottery numbers on the pick slip.

Figure 7:
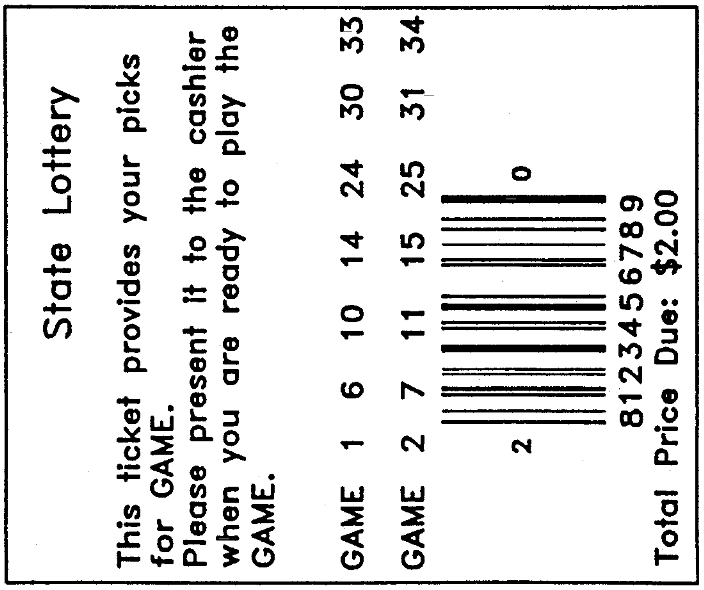

FIG. 7 shows a single UPC-A bar code, which can be used to represent a serial number only, either on a pick slip or on the lottery ticket itself. In this embodiment one bar-coded serial number can represent two (or more) picks stored together in the system (as above, the numbers can be stored within the retail store, or in the central lottery computer until the pick slip is used to generate the actual lottery ticket). Thus, the bar coded serial number enables a look-up function.

Figure 8:
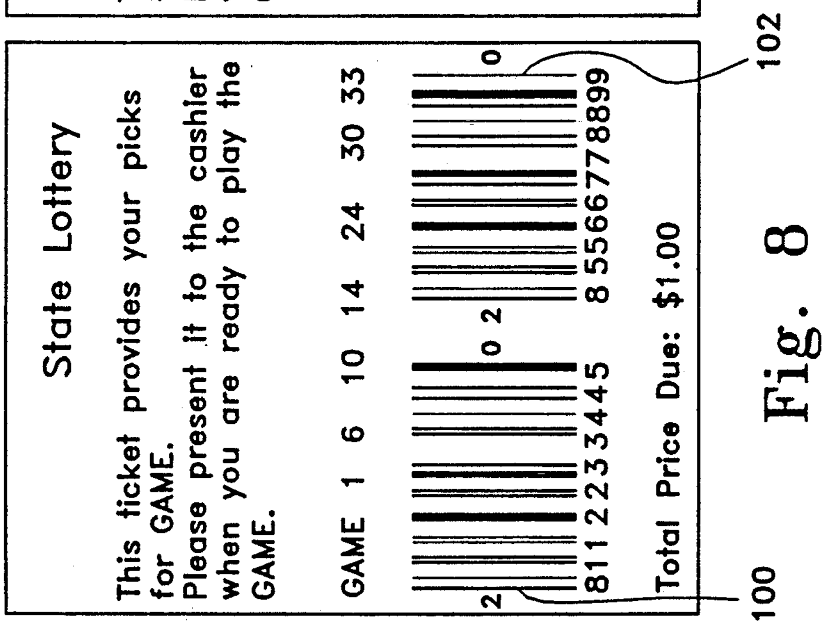

FIG. 8 shows another alternative wherein a pair of UPC-A type bar codes 100 and 102 are stacked side by side. This will enable a maximum of twenty-two data characters, so that a series of six numbers can be represented—a single "lotto" play. A large percentage of conventional scanners can be modified to support such side by side bar codes 100 and 102. The scanner software would be modified so as to always look for two codes, and other modifications would be made.

Figure 9:
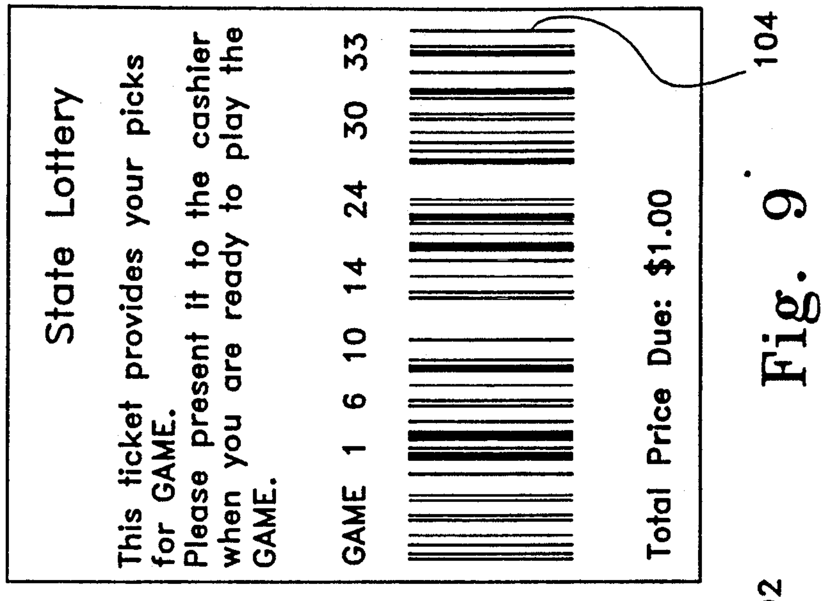
FIGS. 7 through 11 are representations of different bar code formats which can be used on pick slips in the system of the invention, and including different embodiments of what data is represented on the pick slip.

FIG. 9 shows another alternative which involves a different version of a UPC bar code which has been proposed and which is known as version D symbology, enabling more data digits to be represented. UPC-D is seen as a potential bar code of the future for applications requiring additional data. A large number of present scanners can read UPC-D, which represents a maximum of 22 data characters. Thus, the UPC-D bar code 104 as shown in FIG. 9 can be encoded on a pick slip to represent a single play in a "lotto" game, with six customer-selected numbers.

One advantage of having the actual selected numbers bar coded onto a pick slip is that a customer/player who repeatedly plays favorite numbers can retain and carry a pick slip and repeatedly use it for playing a succession of lottery games. The bar coded information can include information regarding the type of game being played (if there are alternatives), or other needed additional data.

Figure 10:
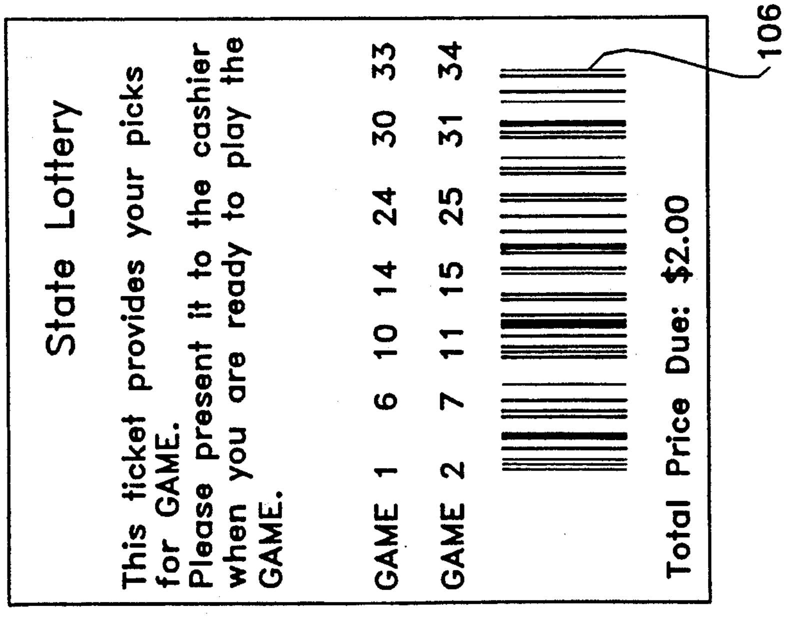

A fourth alternative is shown in FIG. 10, showing an example of a Code 128 bar code 106. This type of bar code is variable and of unrestricted length. The sample 106 illustrated in FIG. 10 carries 28 data characters, which would allow two picked number series and an additional four digits. The two series of numbers are labeled as "GAME 1" and "GAME 2".

The Code 128 type of bar code is an alternative, non-UPC symbology, not supported by the conventional POS scanning equipment in supermarkets. New Code 128-capable scanners are required. Also, these codes, which can be expanded in length without restriction, are not omnidirectional, so that more attention is needed in the scanning of a slip with such codes.

For any of the described alternatives, the supermarket scanner still communicates with the POS system in the conventional manner, i.e. the scanned bar code information would indicate to the POS system that a lottery ticket or pick slip has been presented, and an appropriate charge will be made to the customer using the POS system.

Figure 11:
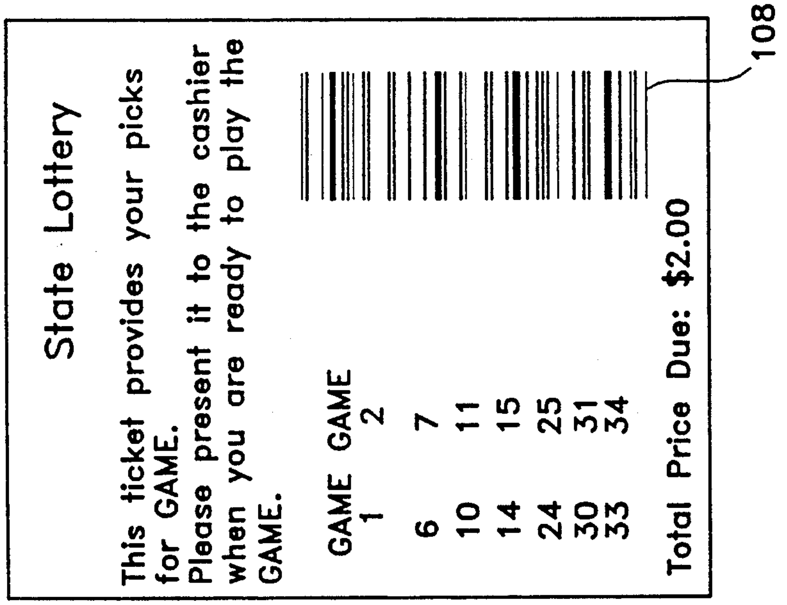
Figure 12:
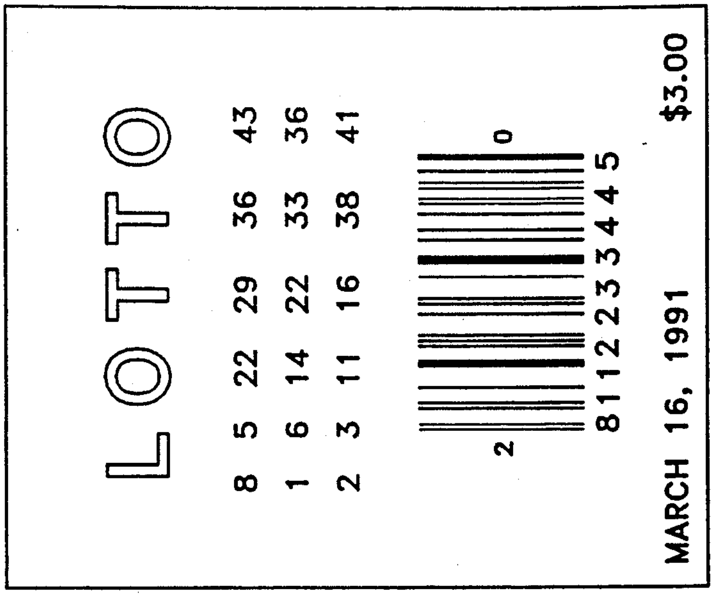
FIG. 12 is a representation of a lottery ticket, as distinguished from the pick slip shown in the other drawings.

FIG. 11 shows a modification of the arrangement shown in FIG. 10. Again, a Code 128 bar code 108 is printed on the pick slip, but presented in vertical format. The selected numbers are also printed in vertical format, as shown, under designation "GAME 1" and "GAME 2".

In FIG. 7, showing the UPC-A bar code, it is indicated that the number 2 can be the first character, identifying the label as an in-store printed label. Preferably the second character will be defined to have a meaning in the store that this is a lottery transaction, as discussed above. This leaves nine more available data characters, for representing a serial number and any other needed information (the last character is a 0). The embodiment of FIG. 7 accommodates and fits within UPC guidelines, an important advantage.

The system of the invention is efficient and advantageous in interfacing lottery sales with a supermarket or other multi-check stand POS system which uses bar codes, without requiring new programming of the POS terminals or the POS network. By avoiding the need to interface into the store network, the lottery ticket handling system of the invention remains independent of the store network, and merely requires that the store network database include information regarding lottery transactions. Thus, lottery ticket sales are handled by the POS network in the same manner as a loaf of bread or other grocery items.

If a lottery ticket issuance and redemption system were to be attached into the store POS network, a different software would be required for each different version of store network, requiring substantial expense. The system of the invention is actually transparent to and independent of the store network, with the "black box" positioned between the scanner and the POS network. This enables a single lottery ticket handling system, as described above, to be compatible with and transparent to different versions of network systems involving different network software. Thus, the system of the invention can be fitted and installed in conjunction with preexisting POS systems in supermarkets, with full compatibility and with a single lottery system software.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In a point of sale bar code reader system having capability for scanning purchased store-inventory items and for entering data related to purchased items into a point of sale network which includes a plurality of point of sale cash registers, and the bar code reader system including bar code scanners connected into the point of sale network at check stands in the store, and including a store controller in the network, a system for issuing of and redemption of lottery tickets, comprising, a lottery pick slip generating device having means for enabling a lottery player to enter selected lottery numbers for playing a lottery game, means for storing in memory the selected lottery numbers in association with a look-up number, and means for printing on a lottery pick slip a bar code representing the look-up number and identifying the pick slip transaction, lottery data receiving means connected to the bar code scanner at least at some of the check stands and being connected between the bar code scanner and the point of sale network at such check stands, the lottery data receiving means including means for recognizing the bar coded look-up number imprinted on the pick slip when the pick slip is read by the scanner, for differentiating pick slips from store-inventory items, and for receiving data from the pick slip generating device including the selected lottery numbers in association with the look-up number when the bar code on the pick slip is read by the scanner, ticket printing means connected to the lottery data receiving means for printing a lottery ticket based on the numbers selected by the lottery player, and showing the selected numbers on the printed lottery ticket, modem means connected to the lottery data receiving means for telephone line communication with a remote central lottery processor, and for sending data relating to each lottery transaction and the numbers selected by the player for the lottery game, and for receiving back from the central lottery processor an appropriate confirmation, the lottery data receiving means including lottery transaction transmitting means for sending data relating to particular lottery transactions at a check stand to the modem means for communication to the central lottery processor, the lottery data receiving means further including means for communicating with the store point of sale network and presenting lottery transaction data to the POS network that can be understood by the store controller in the same manner as purchased store-inventory item data is understood and received, thus not requiring new programming of the point of sale network or any of the point of sale cash registers, and the store point of sale network including means for sending to the point of sale cash register data charging the lottery player/customer and causing the lottery ticket issuance transaction and sale to be recorded by the point of sale cash register and reflected on a receipt along with purchased store-inventory items.

2. The system of claim 1, wherein the lottery pick slip generating device is connected to each of the lottery data receiving means in the store, and the lottery data receiving means having call-up means for calling up from the memory of the lottery pick slip generating device the selected lottery numbers after the bar coded look-up number has been read by the scanner.

3. The system of claim 2, wherein all of the lottery data receiving means at check stands in the store are connected together in a network, with the lottery pick slip generating device also connected into the network.

4. A method for generating and processing lottery tickets in connection with a point of sale bar code reader system having capability for scanning purchased store-inventory items and for entering data related to purchased items into a point of sale network which includes a plurality of point of sale terminals with cash registers, with the bar code reader system also including bar code scanners connected into the point of sale network at check stands in the store, and with a store controller in the point of sale network, without requiring new programming of the point of sale network or the point of sale terminals and in a manner which is compatible with and transparent to the point of sale network, the method comprising:

a) providing a pick slip stand, for use by lottery-playing customers, b) providing a lottery data receiving or "black box" device at each of several check stands in the store, with all of the black box devices connected to the pick slip stand so as to enable data stored at the pick slip stand to be called up at a check stand, generating, via a lottery playing customer, a pick slip at the pick slip stand, the pick slip having printed on it a look-up number representative of play numbers as selected by the customer, and storing the play numbers in memory at the pick slip stand, c) at a check stand of the store, causing the bar coded look-up number on the pick slip to be read by the check stand bar code scanner, d) automatically determining via the black box device whether the read bar code represents a lottery item before the bar code data goes to the point of sale terminal and into the point of sale network, and if the bar code does represent a lottery transaction, preventing the bar code data from going to the point of sale terminal and into the point of sale network, e) obtaining data relating to the customer's picked play numbers from the memory at the pick stand, by automatic look-up in association with the read, barcoded look-up number, and temporarily storing the data including the lottery play numbers in a memory or buffer, f) calling a central lottery computer using a modem and telephone line, and sending the lottery transaction data including the customer's lottery play numbers to the central lottery computer, g) receiving acknowledgement of the lottery transaction from the central lottery computer over the telephone line and modem, along with a lottery transaction serial number, h) printing a lottery ticket for the customer, showing the selected lottery play numbers and including the lottery transaction serial number printed in bar code format, i) sending a record to the point of sale network denoting a debit to the customer for the lottery sale transaction, j) through the store point of sale network, debiting the customer for the lottery sale transaction and showing the lottery transaction and debit on a cash register receipt being printed at the cash register at the point of sale terminal, k) advancing the lottery ticket to the customer, and l) when all check stand sale transactions have been completed, charging the customer for all sale transactions including the lottery transaction, and issuing a receipt for the customer denoting the sale of store-inventory items and the lottery transaction, whereby the lottery transaction is handled independent of the store point of sale network and is compatible with and transparent to the point of sale network, without requiring any different programming of the point of sale network than that which exists for processing store-inventory item purchases.

5. The method of claim 4, further including, at the check stand, printing the customer's selected play numbers on the pick slip, so that they may be read and verified by the customer.

6. The method of claim 4, further including continuing to pass normal grocery or store inventory items through the check stand and reading their bar codes using the bar code scanner at the check stand, while steps (d) through (h) are conducted.

7. In a point of sale bar code reader system having capability for scanning purchased store-inventory items and for entering data related to purchased items into a point of sale network which includes a plurality of point of sale cash registers, and the bar code reader system including bar code scanners connected into the point of sale network at check stands in the store, and including a store controller in the network, a system for issuing and redemption of lottery tickets, comprising, lottery data receiving means connected to at least one of the bar code scanners so as to receive data scanned by bar code scanners at such check stands, the lottery data receiving means including means for recognizing b bar coded number carried on a lottery slip generated by or for the customer when the slip is read by the scanner, and for differentiating lottery slips from store-inventory items, said bar coded number comprising either a series of lottery numbers selected by or for the customer or a coded look-up number by which the lottery data receiving means can determine lottery numbers picked by or for the customer, the lottery data receiving means further including means for communicating with the store point of sale network and presenting lottery transaction data to the POS network that can be understood by the store controller in the same manner as purchased store-inventory item data is understood and received, thus not requiring new programming of the point of sale network or any of the point of sale cash registers, and the store point of sale network including means for sending to the point of sale cash register data relating to the lottery transaction.

8. The system of claim 7, further including communication link means connected to the lottery data receiving means for communication with a remote central lottery processor, and for sending data relating to each lottery transaction and the numbers selected by the player for the lottery game, and for receiving back from the central lottery processor an appropriate confirmation.

9. The system of claim 7, wherein the store point of sale network includes means for charging the lottery player/customer and causing the lottery ticket issuance transaction and sale to be recorded by the point of sale cash register and reflected on a receipt along with purchased store-inventories items.

10. The system of claim 7, further including a lottery pick slip generating device, having means for enabling a lottery player to enter customer-selected or randomly selected lottery numbers for playing a lottery game, means for storing in memory the selected lottery numbers in association with a look-up number, and means for printing on a lottery pick slip a bar code representing the look-up number and identifying the pick slip transaction, comprising said coded look-up number, and wherein the lottery data receiving means include means for recognizing the bar coded look-up number imprinted on the pick slip when the pick slip is ready by the scanner, and for receiving data from the lottery pick slip generating device including the selected lottery numbers in association with the look-up number, identified by the bar code on the pick slip read by the scanner.

11. The system of claim 10, including ticket printing means connected to the lottery data receiving means for printing a lottery ticket based on the numbers selected by the lottery player, and showing the selected numbers on the printed lottery ticket.

12. The system of claim 8, wherein the lottery data receiving means includes lottery transaction transmitting means for sending data relating to particular lottery transactions at a check stand to the communication link means for communication to the central lottery processor.

13. The system of claim 10, wherein the lottery pick slip generating device is connected to each of the lottery data receiving means in the store, and the lottery data receiving means having call-up means for calling up from the memory of the lottery pick slip generating device the selected lottery numbers after the bar coded look-up number has been read by the scanner.

14. The system of claim 13, wherein all of the lottery data receiving means at check stands in the store are connected together in a network, with the lottery pick slip generating device also connected into the network.

15. A method for generating and processing lottery tickets in connection with a point of sale bar code reader system having capability for scanning purchased store-inventory items and for entering data related to a purchased items into a point of sale network which includes a plurality of point of sale terminals with cash registers, with the bar code reader system also including bar code scanners connected into the point of sale network at check stands in the store, and with a store controller in the point of sale network, without requiring new programming of the point of sale network or the point of sale terminals and in a manner which is compatible with and transparent to the point of sale network, the method comprising:

a) providing a lottery data receiving or "black box" device connected to at least one of several check stands in the store, with means for at least one of several check stands in the store, with means for recognizing a bar coded number carried on a lottery slip generated by or for the customer when the slip is read by the scanner, and for differentiating lottery slips from store-inventory items, said bar coded number comprising either a series of lottery numbers selected by or for the customer or a coded look-up number by which the lottery data receiving means can determine lottery numbers picked by or for the customer, b) at a check stand of the store, causing a bar coded number on such a lottery slip to be read by the check stand bar code scanner, c) automatically determining via the black box device whether the read bar code represents a lottery item before the bar code data goes to the point of sale terminal and into the point of sale network, and if the bar code does represent a lottery transaction, preventing the bar code data from going to the point of sale terminal and into the point of sale network, d) obtaining data relating to the customer's picked play numbers from the bar coded number on the lottery slip if contained therein, or from a storage memory if the bar coded number is a coded look-up number, and temporarily storing the data including the lottery play numbers in a memory or buffer, e) sending a record to the point of sale network denoting a debit to the customer for the lottery sale transaction, f) when all check stand sale transactions have been completed, charging the customer for all sale transactions including the lottery transaction, whereby the lottery transaction is handled independent of the store point of sale network and is compatible with and transparent to the point of sale network, without requiring any different programming of the point of sale network than that which exists for processing store-inventory item purchases.

16. The method of claim 15, further including providing a pick slip stand for use by lottery playing customers, with all of the black box devices connected to the pick slips stand so as to enable data stored at the pick slip stand to be called up at a check stand, and generating, via a lottery playing customer, a pick slip at the pick slip stand, the pick slip having printed on it a look-up number as said bar coded number on the lottery slip, representative of play numbers as selected by the customer, and including storing the play numbers in memory for later retrieval, and, at the check stand, reading the bar coded look-up number on the pick slip as bar coded number on the lottery slip, then calling from memory the customer's pick play numbers associated with the look-up number.

17. The method of claim 15, further including, following step (d), calling a central lottery computer using a communication link and sending the lottery transaction data including the customer's lottery play numbers to the central lottery computer, and receiving acknowledgement of the lottery transaction from the central lottery computer over the communication link, along with a lottery transaction serial number.

18. The method of claim 17, wherein the bar coded number on the lottery slip is a coded look-up number, and including sending the customer's picked play numbers to the central lottery computer on the communication link in association with the coded look-up number, and storing the play numbers and look-up number in the central lottery computer until the customer's lottery slip is read at the check stand of the store, then sending the play numbers to the black box device for processing in the point of sale network.

19. The system of claim 15, further including, at the check stand, printing the customer's selected play numbers on the pick slip, so that they may be read and verified by the customer.

20. The system of claim 15, further including, subsequent to step (d), printing a lottery ticket for the customer, showing the selected lottery play numbers.

21. The method of claim 15, further including continuing to pass normal grocery or store inventory items through the check stand and reading their bar codes using the bar code scanner at the check stand, while steps (c) and (d) are conducted.

* * * * *

UNITED STATES PATENT AND TRADEMARK OFFICE

CERTIFICATE OF CORRECTION

PATENT NO. : 5,239,165

DATED : August 24, 1993

INVENTOR(S) : Jeffrey M. Novak

It is certified that error appears in the above-indentified patent and that said Letters Patent is hereby corrected as shown below:

Column 17, line 53:

Correct "b" to read --a--

Column 18, line 19:

Correct "store-inventories" to read --store-inventoried--

Column 18, line 29:

Correct "include" to read --includes--

Column 18, line 61:

Delete "a"

Column 19, lines 6-7:

Delete "with means for at least one of several check stands in the store,"

UNITED STATES PATENT AND TRADEMARK OFFICE

CERTIFICATE OF CORRECTION

PATENT NO. : 5,239,165

DATED : August 24, 1993

INVENTOR(S) : Jeffrey M. Novak

It is certified that error appears in the above-indentified patent and that said Letters Patent is hereby corrected as shown below:

Column 20, line 34:

Correct "system" to read --method--

Column 20, line 38:

Correct "system" to read --method--

Column 20, line 45:

Correct "and" to read --through--

Signed and Sealed this

Second Day of August, 1994

Attest:

BRUCE LEHMAN

Attesting Officer

Commissioner of Patents and Trademarks